US005561556A

United States Patent [19]
Weissman

[11] Patent Number: 5,561,556
[45] Date of Patent: Oct. 1, 1996

[54] SLIDE ANALYSIS SYSTEM WITH SLIDE HAVING SELF CONTAINED MICROSCOPE ANALYSIS INFORMATION

[75] Inventor: Mark Weissman, Wayland, Mass.

[73] Assignee: CompuCyte Corporation, Cambridge, Mass.

[21] Appl. No.: 230,807

[22] Filed: Apr. 21, 1994

[51] Int. Cl.$^6$ ............................. G02B 21/34; G02B 21/26
[52] U.S. Cl. ............................................. 359/396; 359/391
[58] Field of Search ..................................... 359/391–398, 359/368; 235/375; 356/244, 246; 435/4, 287, 299

[56] References Cited

U.S. PATENT DOCUMENTS

| | | | |
|---|---|---|---|
| 4,087,154 | 5/1978 | Menzel | 359/396 |
| 4,164,320 | 8/1979 | Irazoqui et al. | 235/375 |
| 4,476,149 | 10/1984 | Poppe et al. | 235/375 |
| 4,476,381 | 10/1984 | Rubin | 235/375 |
| 5,381,487 | 1/1995 | Shamos | 235/375 |

*Primary Examiner*—Thong Nguyen
*Attorney, Agent, or Firm*—Israel Nissenbaum

[57] ABSTRACT

A microscope slide and read-write system whereby the slide has a pathology specimen thereon and machine readable high density recording media in the form of a magnetic strip, optical reading strip or the like. The read-write system accommodates initial writing of slide and patient identification information on the recording media. The read-write system further embodies elements for operative connection to a microscope system whereby a computer generated representation of the screening history of pathology specimen is recorded and maintained during pathology analysis of the slide showing the mode and parameters of the analysis as well as position related events of interest. The computer generated screening representation is written to the recording media by the read-write system, for constant proximate availability with the slide. The recording media comprises sufficient capacity for encodation with patient identification and medical history information, and slide diagnostic information and analysis for pathological review of the particular pathology specimen on the slide. Compatible read-write systems permit reading and editing of recording media encodation for slide analysis at any time or place without requirements of correlative external files.

17 Claims, 5 Drawing Sheets

5,561,556

SLIDE ANALYSIS SYSTEM WITH SLIDE HAVING SELF CONTAINED MICROSCOPE ANALYSIS INFORMATION

FIELD OF THE INVENTION

This invention relates to pathology slide analysis and review, and means for effecting such analysis and review.

BACKGROUND OF THE INVENTION

Pathology specimens on slides, such as Pap smears, are examined under microscopes for various events of interest such as possible cancer cells and the like. The examination focuses primarily on a review of the cells of the specimen, with notation of events of interest at specific locations in the specimen on the slide. Separate and independent review of the examination, and any analysis which accompanied the initial screening examination, particularly for quality control purposes and for verification of findings, should take into account the thoroughness with which the original microscope examination was conducted, though this has been difficult to achieve.

The original screening and analysis should include four basic types of information which are: 1) identifying information to tie the specimen of the slide to a particular source or patient, 2) information which may be useful to the person analyzing the slide, 3) the location and characterization of specific events, found by screening the slide, and 4) a history of the screening process including whatever quality control parameters may have been utilized. However, such information is not amenable to recordation on the slide itself except on the most rudimentary levels of identifying information in the form of handwritten, typed or printed labels, or bar-coded labels. Information regarding the actual slide specimen analysis is kept in computer files, in paper records, on tape recorded narrations, or by other means, all of which are maintained at locations separated from the individual slides.

To preserve a modicum of proximate information it has been the practice to directly mark events of interest in such a manner which facilitates ready review. A common method of such marking, is ink dot placement at events of interest. Some of these ink dot placements are effected by sophisticated mechanized and computerized means. However, despite the degree of sophistication, this method is messy, inaccurate and time consuming. Furthermore, ink dots typically cover an entire field of view, which may contain hundreds of cells and the dots can obscure the field of view, either directly or with smearing of the ink.

Alternatively, various relocation methods and expedients have been utilized as well as other means to either actually record the original analysis or to map out, by slide coordinates, the areas of specific interest. Examples of such recordations include optical video taping, and computerized specimen mapping and correlative computer generated imaging. Many of such alternative methods, including the computer generated slide examination representation, as described in U.S. Ser. No. 08/089,243, filed on Jul. 19, 1993, and owned by the same assignee as the present invention (the disclosure of which is incorporated herein by reference thereto), involve recordation on external media (e.g. video tape and magnetic disks). Such methods work well, provided that the pathology slides are proximate in time and place wherein the external media are readily available for review and analysis, with correlation to the slide. However, after a lapse in time and the transfer of the slide to remote locations, typically for consultation, research and testing purposes, the ability of the slide to be properly analyzed, is severely retarded, short of another review and scanning of the slide, in the absence, loss or other unavailability of the externally separately stored screening analysis.

Currently, direct marking of slides is restricted to the ink dot placement described above and handwritten, printed, or bar coded labels which can be used to, at most, identify slides but which are incapable of retaining vital patient information, such as medical history which may be of critical importance for the screener in making an accurate diagnosis, such as distinguishing reparative reactions from malignancy. Though such information may be contained in the laboratory's computerized information system (LIS), it may not always be available at remote testing or reviewing locations. Further marking of the slide is restricted by the very nature of the slide and specimen, wherein marking, even on the obverse side of the slide, interferes with proper viewing of the specimen (obverse-side marking detrimentally blocks light from illuminating portions of the specimen).

It is important that at least this criterion be evaluated in order to assure a competent initial screening, i.e., a valid demonstration that the entire slide has been screened so that no important events have been missed.

In addition, to assure the validity of analysis of a screening it is necessary to demonstrate that the screener is able to locate noteworthy events on the slide; and that the screener has been able to accurately characterize such events.

As currently used, the label is of insufficient size to record the history of the screening, and ink dot placement alone is deficient in accurately providing such information.

Various devices and means are capable of evaluating all of the above and storing the information in the LIS or on PCMCIA cards or diskettes. However, as described above, the information may not be readily available when the slide is being reviewed, for example, when a patient has a positive finding on a PAP smear and the laboratory recalls PAP smears on the patient from prior years to determine whether cancer cells were missed.

It is therefore an object of the present invention to provide a means for providing a pathology slide with both specimen and integral review and interpretation thereof, making it viably reviewable without any separate original screening information.

It is a further object of the present invention to provide the pathology slide with high density machine recordable and readable media capable of recording both identification information relative to the specimen and review interpretation of the slide for recall and correlation to the actual specimen.

It is yet another object of the present invention to provide a slide analysis system which includes a slide having machine recordable media thereon, with high information recordation capacity, but which strip does not interfere with slide analysis.

These and other objects, features and advantages of the present invention will become more evident from the following discussion as well as the drawings in which:

SHORT DESCRIPTION OF THE DRAWINGS

SUMMARY OF THE INVENTION

Figure 1A:
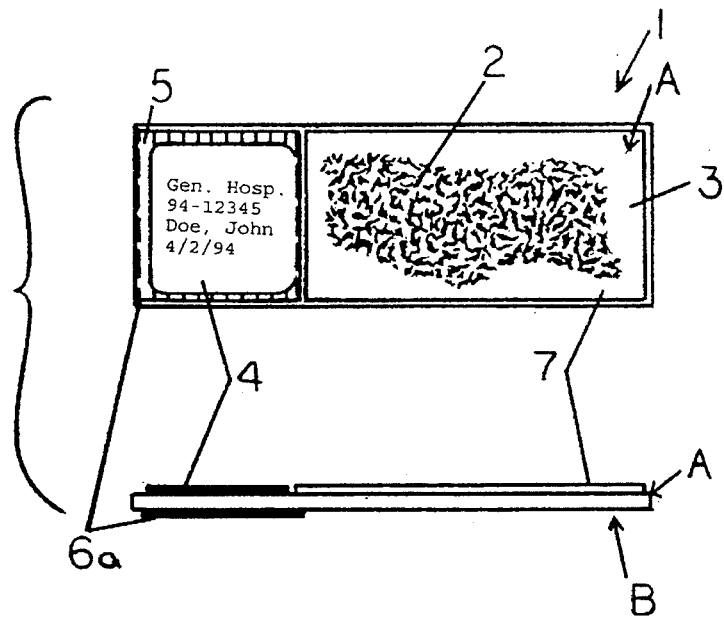
FIG. 1a, depicts a slide of the present invention having a specimen thereon and a recordable magnetic strip.

Generally the present invention comprises a system for correlatively providing a pathology slide, having a specimen and optionally a written identification label thereon, with integral recordation means for recordation of the parameters of the screening thereof and interpretation of the analysis, for proximate review without external data sources. The present invention further encompasses such slides with integral recordation means.

The system comprises a microscope viewable slide with a high density machine-writable recording medium such as a magnetic strip, a strip optically readable by a laser, or high density paper or plastic data strips, writable by commercially available laser printers (e.g., as sold under the trademark Softstrip by Softstrip, Inc., Waterbury, Conn.), having capacity sufficient to retain identification and analysis information which at the very least: a) correlatively identifies the specimen source, b) indicates that area of the slide which has been screened, and c) identifies by coordinates, or otherwise, the location of specific events of interest in the specimen, whereby such events can be readily located through the microscope. Each of these media should have a storage capacity of at least 70 bytes per slide, sufficient to mark about 20 locations of interest on the slide, with 3 bytes for each location, and the remaining bytes to set time and date of screening, screener identification, slide i.d., and the percentage of slide scanned. The storage media on the slide should have long term stability, particularly with respect to environmental conditions typically encountered by slides in laboratory settings. Accordingly, the particular medium being used should either be initially selected for its stability or protected in a manner which does not affect its ability to have information read therefrom or written thereon. It is understood that the shape of the strip may be of any form which is compatible with the operation of the read-write head operable therewith. These include circles, blocks, strips, multiple stripes and the like.

DETAILED DESCRIPTION OF THE INVENTION

The placement position of the recording medium on the slide is at a location which does not directly or indirectly affect viewing of the slide. The recording medium may be adjacent but removed from the specimen (on either side of the slide or along the edge thereof). If a label is utilized on the slide, the recording medium is positioned for being read or written on, from the side of the slide obverse to the specimen. This permits viewing of the specimen and reading and writing on the label. With magnetic or paper media, requiring direct contact reading or writing, the media is directly placed on the obverse side of the slide. With an optically readable type of medium, which can be read through the transparent glass or plastic of the slide, it can be placed under the label, or it can be integral with the underside of the label.

With slides having masked areas, the recording media may be placed directly upon the masked areas or on the opposite side of the slide, in line with the masked areas. In all instances the recording media should not interfere with viewing of the specimen on the slide by either placement directly on the specimen area (as protectively covered by a laminate or a cover slip) or on a position of the slide which blocks light from illuminating the specimen.

With respect to the magnetic recording media, in a preferred currently available embodiment, patient information is encoded on a magnetic strip as flux transitions using a magnetic head unit. The unit may contain one or more magnetic heads, and as the strip is passed through the unit (it is preferred, for simplicity, that the head be stationary and the slide, with magnetic strip thereon, is moved relative thereto), the first head encodes the strip and a second head verifies or reads previously recorded information, to ensure high quality encoding. Alternatively, a single head affects both encoding and verification. Typically slide labels utilize about one third the area of the slide and the specimen substantially or completely covers the remaining two thirds of the slide. With a typical slide of 75×25 mm, the specimen area is about 50×25 and the label covers an area of about 25×25 mm. The magnetic strip, because of slide and specimen dimensions, with standard 75×25 mm slides, generally occupies a maximum area of 25×25 mm. It is available in single, dual, or multiple-track configurations according to the information capacity required above the minimum amount. These strip are preferably affixed to the microscope slide by either a hot stamp method, suitable for plastic slides or an adhesive method using a polyester carrier. A thin protective overlay such as a polyurethane may be applied to protect the encoded information provided that it does not interfere with the magnetic reading and writing.

Optical recording media are similar to those used in compact discs or laser disc storage systems, but with the ability to be written on as well as being read. These media provide very high storage capacity suitable for complete recordation of computer generated imaging of the original screening as described in said co-pending application. Vital patient information is encoded as high density optical bit patterns on a carrier permanently affixed to the slide as described above. The encoded information may be retrieved by using commercially available CD ROM technology.

The high density printing on paper or plastic is another means for information recordation and it provides about 960 characters/sq. inch which is about the 25×25 mm maximum available area on standard slides. Commercial laser printers are utilized to print the information. A polyester carrier is preferably used for effecting adhesion thereof to the slide and a protective overly is generally required to protect the carbon printing deposits from degradation. A page scanner is utilized for the information retrieval.

In accordance with the present invention, the slide is provided with screening information of its own contents. It is however, difficult to simultaneously screen the slide on the microscope stage and write the screening information to the recording medium on the slide. Accordingly, the slide is utilized in conjunction with a read-write device, having a head operatively connected to a downloadable memory or computer storage device, with the screening information being stored therein.

With such utilization, the slide is initially placed proximate the read/write head attached to a LIS to initialize the slide with source identification information, e.g., patient's name, ID number, slide accession number, age, sex and any relevant medical history such as a prior history of cancer. Thereafter, typically a tray of 20 or more of such slides is assembled and assigned to a screener. The screener selects a slide for microscope screening and analysis which microscope is linked to a device, such as described in the co-pending application previously referred to. The device correlates microscope movement via an encoder to a computer generated screening representation. The device is modified, in accordance with the present invention to further embody a read/write head for reading the information contained on the slide. The recording medium on the slide is operatively connected to the reader prior to the placement thereof on the microscope stage. The device then initially displays the patient identification, previously recorded on the slide. After reading the patient identification and medical history, the screener places the slide on the microscope stage for scanning, and uses the encoder device to note the location of any specific events and their coded categories. During review and analysis of the pathology specimen, computer generated screening representation of the slide and specimen content with interpretation is stored on external recording media or in virtual memory (RAM) and thereafter downloaded on the recording medium, integral with the slide, whereby the slide specimen and interpretation thereof are commonly provided on the same slide. After screening is complete, the recording medium on the slide is again operatively linked to the read/write head of the device whereby data regarding specific events that were marked, as well as data regarding the history of the screening process itself is downloaded thereon. With the very high storage capacity of the optical media, the entire computer generated slide screening history can be downloaded, if desired.

For review of the slide for quality control purposes, all that is required is that the recording media of the slide be operatively associated with the read/write head of any similar computerized encoder device to display all the data previously entered. Parameters checked are the duration of the screening, the percentage of slide screened and the location and classification of any specific types of events which were recorded all without need to access the storage files of a LIS.

To test for screener proficiency, recordable slides are prepared by experts with stored data being made inaccessible to testees, with later comparison between the testees results and that of the originally encoded data of the experts.

DETAILED DESCRIPTION OF THE DRAWINGS AND THE PREFERRED EMBODIMENTS

Figure 1B:
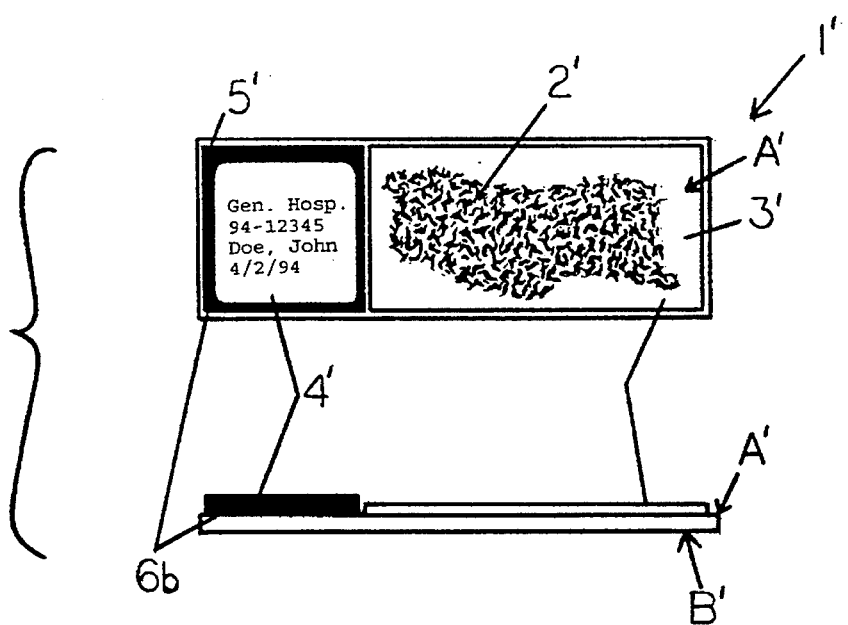
FIG. 1b is similar to that of FIG. 1a but with an optical recordable strip thereon.

With specific reference to the drawings, in FIGS. 1a and 1b, specimen slides 1 and 1' respectively are depicted with specimens 2 and 2' thereon. The portions of the respective slides 1 and 1' covered by the respective specimens are shown as 3 and 3' and the identification labels 4 and 4' are shown in areas 5 and 5' respectively. The specimen 2 of slide 1 is on side A of the slide and magnetic strip 6a is on obverse side B of the slide, directly opposite on the label 4, whereby it does not interfere with specimen illumination on a microscope stage. Slide 1' has a similar configuration but optically read/writable strip 6b is sandwiched between label 4' and the surface of side A' of the slide. A mask, such as the black area shown around the specimen area, permits placement of the magnetic strip 6a and 6b, without interference with viewing of the specimen itself.

Figure 2:
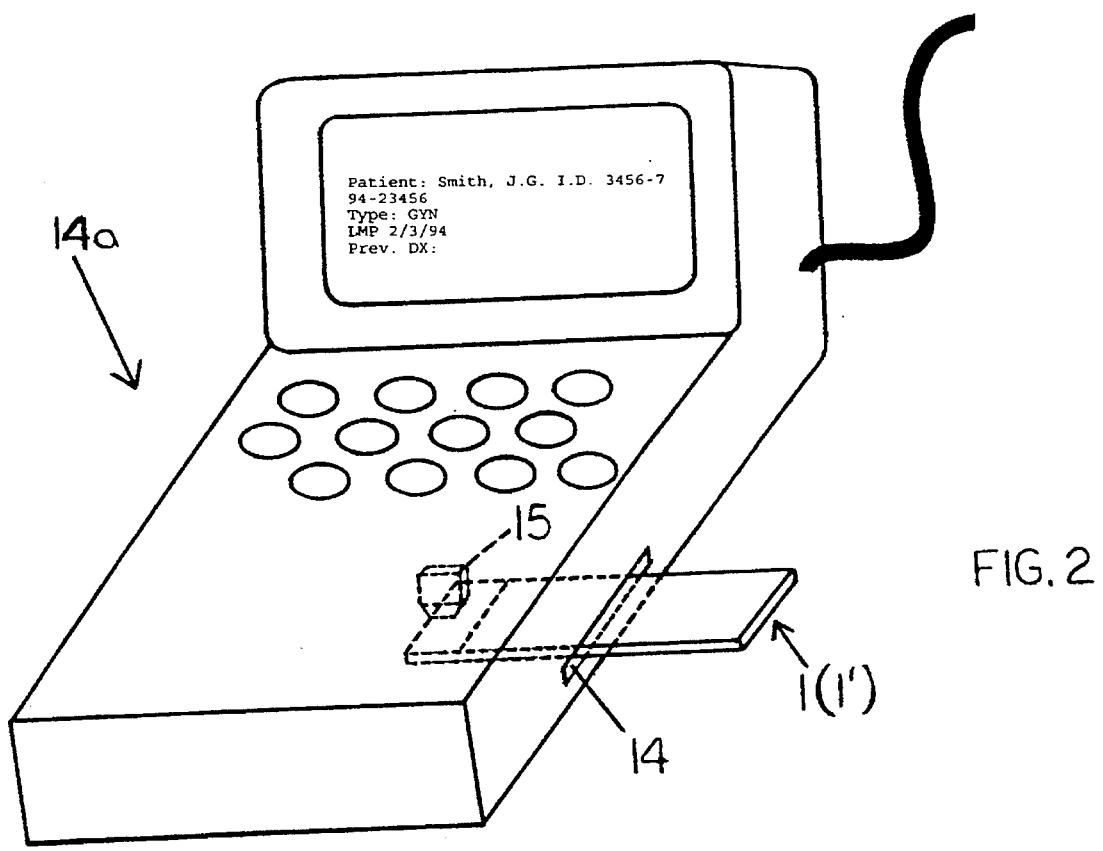
FIG. 2, depicts the slides of either FIGS. 1a or 1b, being initially recorded with source identification data by a strip writing head.

As shown in FIG. 2, the slide 1 or 1' is inserted into slot 14 of LIS-connected read/write device 14a into operative moving juxtaposition of strip 6a or 6b with head 15 (shown in dotted lines) for initial writing of patient identification information and medical history. Head 15 is either magnetic or optical, depending on the nature of the recordable strip. The slides 1 and 1' are prepared for screening or stored for later screening.

Figure 2A:
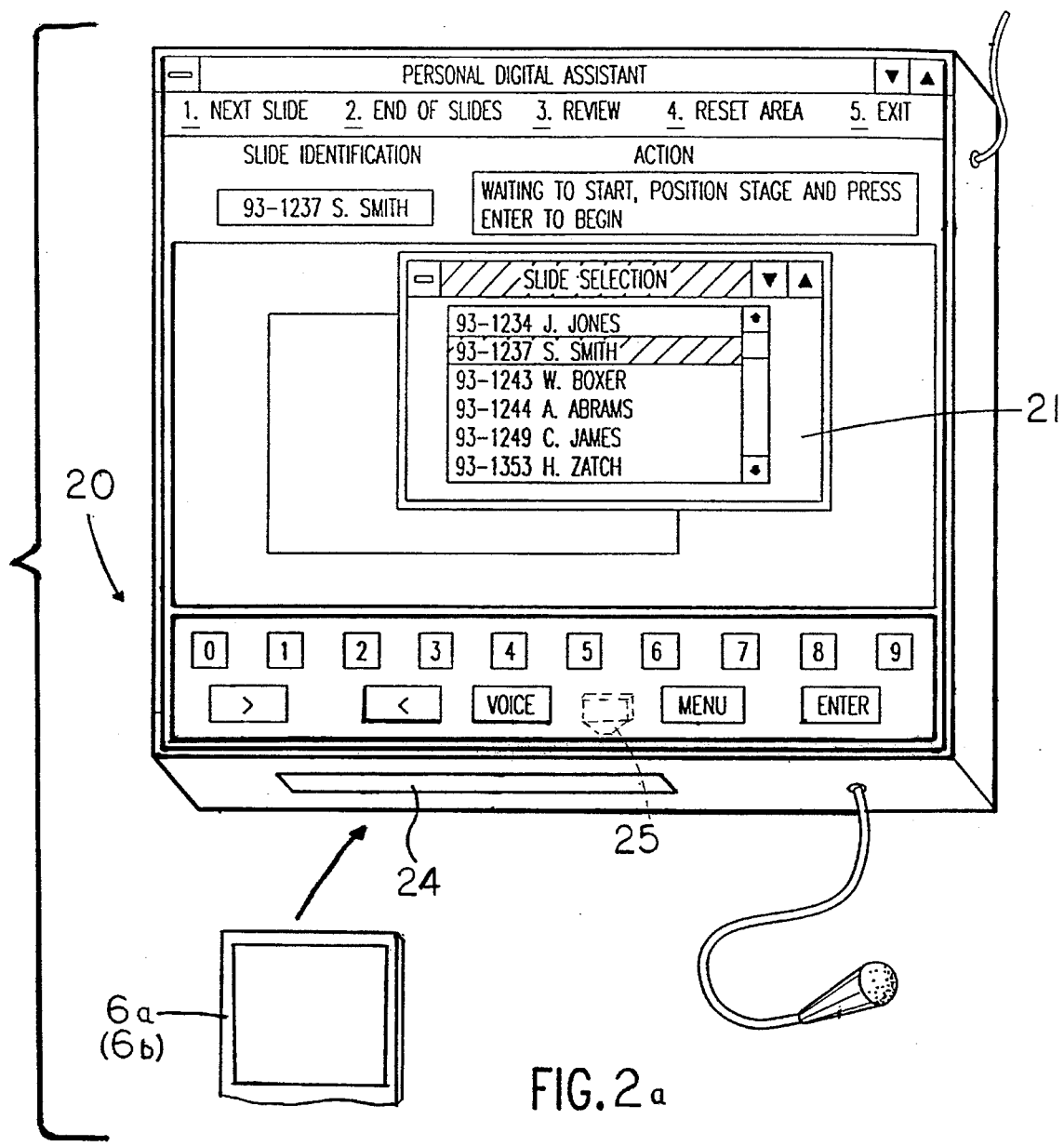
FIG. 2a depicts a screen reading of the identification information written on the slide via its machine readable recording media.

Prior to screening of the slides 1 or 1', as shown in FIG. 2a, the slide 1 or 1' is inserted into slot 24 of computer image generating device and encoder 20 with read/write head 25 for operative moving reading juxtaposition of strip 6a or 6b with head 25 (magnetic or optical depending on nature of the strip). Screen 21 of encoder device 20, exhibits to the screener, the patient identification information and relevant medical history, prior to screening of the slide.

Figure 3:
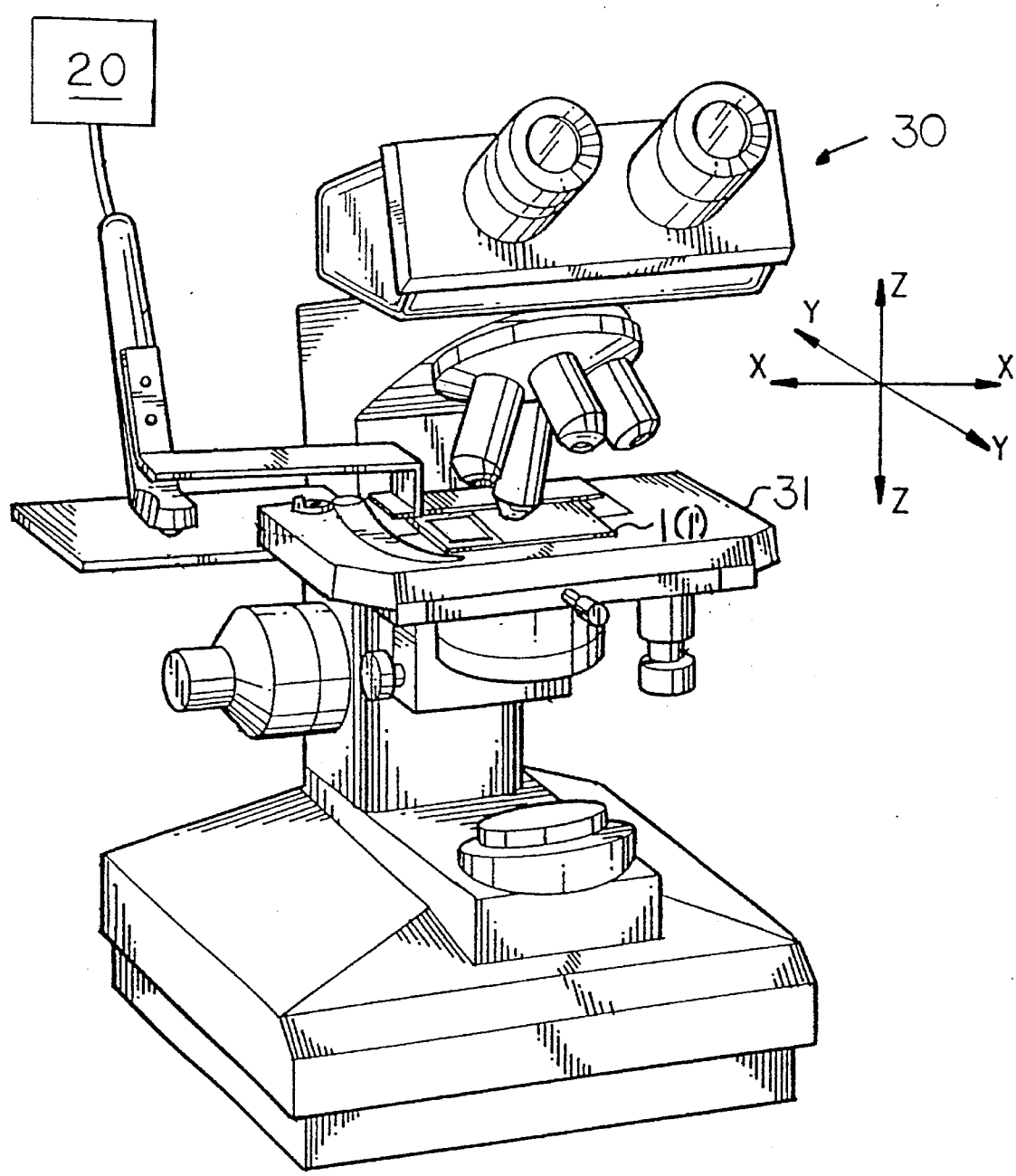
FIG. 3, depicts the slide being screened by microscope with screening information being recorded or retained by a computer.

Thereafter, the slide 1 or 1' is removed from slot 24 and placed on slide stage 31 of microscope 30, as shown in FIG. 3, for standard screening. Connection of the microscope 30 with encoder device 20 (as more fully described in said co-pending application) permits recordation of events of interest discovered during the screening and provides a means for determining screening parameters and scope. Encoder device 20 embodies memory and storage means into which such information is stored.

Figure 4:
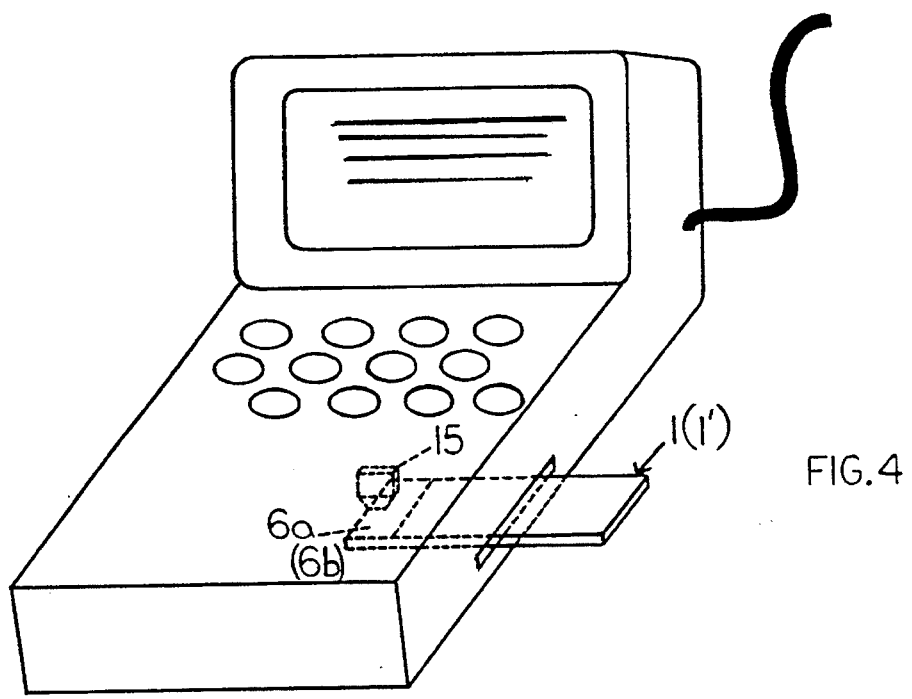
FIG. 4, depicts the slide being inserted into the strip writer, with the screening information, or highlights thereof, being recorded on the machine readable recording media.

As shown in FIG. 4, the slide 1 or 1' is removed from the microscope stage 31 and again brought into operative writing juxtaposition with head 25 for downloading of the screened information and screening parameter information onto strip 6a or 6b. Thereafter the slide 1 and 1' are self contained units of specimen and analysis, which can be read or further written to by any other encoder device 20 with similar read/write head, without necessity for any external data source.

Figure 5:
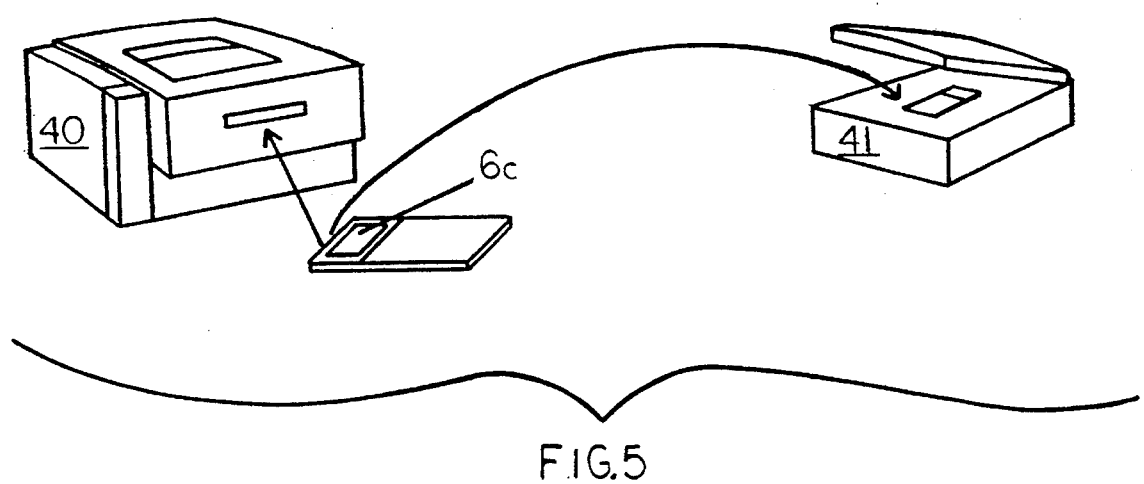
FIG. 5, depicts another embodiment of the system of the present invention.

In place of the read write heads 15 and 25 a laser printer 40 may be utilized with a writable paper or plastic strip such as 6c as shown in FIG. 5, and read by a page scanner 41.

It is understood that the above description and drawings are illustrative of preferred embodiments and that changes may be made in the recording media, placement thereof, as well as the devices used for reading and writing thereon and the like, without departing from the scope of the present invention as defined in the following claims.

What is claimed is:

1. A system for correlatively providing a pathology slide, having a specimen thereon, with integral recordation of parameters of a manner in which microscope screening thereof is effected and interpretation of results of a screening analysis thereof, for proximate review without need for external data sources, said system comprises a microscope viewable slide having two sides, with said specimen being on one side, said slide further comprising a machine-writable and readable recording medium thereon having a storage capacity of at least 70 bytes, said recording medium having long term stability and wherein the recording medium on the slide is at a position removed from a position of the specimen or a position in visual alignment therewith, said system further comprising means for writing relevant information, relative to a source of the specimen, on said recording medium; means for reading and displaying said relevant source information; and means for recording information of screening parameters and analysis of the specimen during said screening and means for downloading said recorded information to said recording medium for subsequent retrieval.

2. The system of claim 1, wherein said recording medium is a magnetic recording medium.

3. The system of claim 2, wherein said slide comprises a label thereon adjacent said specimen and wherein said recording medium is on the side of the slide opposite that of the specimen and only in line with said label.

4. The system of claim 2, wherein said means for writing, said means for reading and displaying, said means for recording and downloading comprise magnetic read/write heads.

5. The system of claim 1, wherein said recording medium is an optical recording medium.

6. The system of claim 5, wherein said slide comprises a label thereon adjacent said specimen and wherein said optical recording medium is between said label and the slide.

7. The system of claim 5, wherein said means for writing, said means for reading and displaying, said means for recording and downloading comprise optical read/write heads.

8. The system of claim 1, wherein said recording medium is a high density printable medium comprised of paper or plastic.

9. The system of claim 8, wherein said slide comprises a label thereon adjacent said specimen and wherein said printable medium is on the side of the slide opposite that of the specimen and only in line with said label.

10. The system of claim 8, wherein said means for writing comprises a laser printer, said means for reading and displaying comprises an optical scanner, and said means for recording and downloading comprises a laser printer.

11. The system of claim 1, wherein said slide comprises masked areas which do not have portions of the specimen thereon and wherein the recording medium is positioned on one or more of said masked areas.

12. A method for integrally providing a pathology specimen slide with analysis information regarding pathology characteristics of a specimen and of parameters of a manner in which microscope screening is effected during a screening of the specimen, said method comprising the steps of: a) providing the slide with a read/write recording medium having a storage capacity of at least 70 bytes, at a position which does not interfere with the screening of the slide, b) recording information relevant to a source of the specimen on said recording medium, c) screening said specimen with a microscope and simultaneously recording information relevant to said screening and the screening parameters in external storage means, and, d) downloading said information relevant to said screening and the screening parameters from said external storage means to said recording medium.

13. The method of claim 12, wherein said relevant information is displayed to a screener prior to screening of the slide.

14. A microscope viewable slide comprising an area thereof on which a specimen for microscope screening is positioned and wherein said slide further comprises machine writable and readable recording means at a position which does not interfere with a screening of the specimen on the slide and wherein said recording means have a capacity of at least 70 bytes and wherein said recording means further comprise means for writing thereon, information derived from microscope screening of the specimen, while the recording means is on the slide.

15. The slide of claim 14, wherein said recording means comprises a magnetic recording medium.

16. The slide of claim 14, wherein said recording means comprises an optical recording medium.

17. The slide of claim 14, wherein said recording means comprises a high density printable medium comprised of paper or plastic.

* * * * *